US012431115B2

(12) United States Patent
Von Bulow

(10) Patent No.: US 12,431,115 B2
(45) Date of Patent: Sep. 30, 2025

(54) WIND NOISE SUPPRESSION SYSTEM

(71) Applicant: GN Audio A/S, Ballerup (DK)

(72) Inventor: Allan Mejlgren Von Bulow, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 194 days.

(21) Appl. No.: 18/055,347

(22) Filed: Nov. 14, 2022

(65) Prior Publication Data

US 2023/0197050 A1 Jun. 22, 2023

(30) Foreign Application Priority Data

Dec. 17, 2021 (EP) .................................... 21215371

(51) Int. Cl.

*H04R 1/10* (2006.01)
*G10K 11/178* (2006.01)
*H04R 3/00* (2006.01)
*G10L 21/0216* (2013.01)
*G10L 21/0264* (2013.01)

(52) U.S. Cl.

CPC ..... *G10K 11/17854* (2018.01); *H04R 1/1083* (2013.01); *H04R 3/005* (2013.01); *G10L 2021/02165* (2013.01); *G10L 21/0264* (2013.01); *H04R 2410/05* (2013.01); *H04R 2410/07* (2013.01)

(58) Field of Classification Search

CPC ...... G10L 21/0264; G10L 2021/02165; H04R 3/005; H04R 2410/05; H04R 2410/07; H04R 1/1083

See application file for complete search history.

(56) References Cited

U.S. PATENT DOCUMENTS 11,172,285 B1 11/2021 Kanaris et al.
2010/0278352 A1* 11/2010 Petit .................... G10L 21/0208 381/71.1

(Continued)

FOREIGN PATENT DOCUMENTS

WO 2011140110 A1 11/2011
WO 2012109384 A1 8/2012

OTHER PUBLICATIONS

The extended European search report issued in European Patent Application No. 21215371.2, dated Apr. 29, 2022, 8 pages.

(Continued)

*Primary Examiner* — Ping Lee
(74) *Attorney, Agent, or Firm* — HSML P. C.

(57) ABSTRACT

A system for wind noise suppression is disclosed. The system comprising a first and a second primary microphone configured to generate a first and a second primary electric signal indicative of a first and second primary audio signal, respectively. The system further comprises a secondary detector configured to generate a first secondary electric signal indicative of a secondary audio signal. The system comprises a signal processor comprising a wind strength module configured to determine a wind strength, based on the first primary electric signal and the second primary electric signal, a wind noise module configured to determine a noise estimate, based on the wind strength, and a noise reduction module configured to process the first secondary electric signal to generate a noise-suppressed secondary signal, based on the determined noise estimate.

11 Claims, 6 Drawing Sheets

(56) References Cited

U.S. PATENT DOCUMENTS

| | | | | |
|---|---|---|---|---|
| 2012/0207315 | A1 | 8/2012 | Kimura et al. | |
| 2018/0234760 | A1 | 8/2018 | Chen et al. | |
| 2020/0322713 | A1* | 10/2020 | Tomoi | H04R 3/00 |

OTHER PUBLICATIONS

Communication pursuant to Article 94(3) EPC issued in European Patent Application No. 21215371.2, dated Sep. 22, 2022, 6 pages.

Communication pursuant to Article 94(3) EPC issued in European Patent Application No. 21215371.2, dated Jul. 11, 2022, 6 pages.

* cited by examiner

WIND NOISE SUPPRESSION SYSTEM

FIELD

The present disclosure relates to a system and a method for wind noise suppression.

BACKGROUND

Communication applications in various environments, e.g., outdoor, in a car, often face the issue of unwanted wind noise components in microphone signals. A signal of interest, such as a speech signal, may be degraded by the wind noise, what in turn leads to a low-quality communication. In some implementations, the wind noise may make it impossible for a far-end recipient to recognize the signal of interest.

Input microphones receiving an input signal reflects instantaneous wind noise level. However, even with that information it is difficult to reduce the wind noise imposed on the input microphones. Hence the usage of an alternative input with a better signal to wind ratio is beneficial. However, even if the signal-to-wind-ratio in the alternative input signal is better, that alternative signal may still comprise noise and it is beneficial to remove that noise. Calculating an instantaneous (faster varying) noise estimate on the alternative input is difficult, and there is a need for a system which can perform such calculation.

Various noise-suppression systems are known in the art. WO 2011140110 A1 discloses systems and methods to reduce the negative impact of wind on an electronic system include use of a first detector that receives a first signal and a second detector that receives a second signal. A voice activity detector (VAD) coupled to the first detector generates a VAD signal when the first signal corresponds to voiced speech. A wind detector coupled to the second detector correlates signals received at the second detector and derives from the correlation wind metrics that characterize wind noise that is acoustic disturbance corresponding to at least one of air flow and air pressure in the second detector. The wind detector controls a configuration of the second detector according to the wind metrics. The wind detector uses the wind metrics to dynamically control mixing of the first signal and the second signal to generate an output signal for transmission.

However, there is still room for improvement in the prior art systems, e.g. with regards to optimizing power consumption, signal processing, or achieving a more robust system. Therefore, there is a need for an improved system for wind noise suppression to overcome problems of the prior art.

SUMMARY

It is an object of the present disclosure to provide an improved audio system which overcomes or at least alleviates the problems of the prior art.

It is also an object of embodiments of the present disclosure to provide a system for suppressing unwanted acoustic disturbances from air pressure and/or air flow in an acoustic signal.

It is also an object of embodiments of the present disclosure to provide a system for wind noise suppression which provides an improved audio signal.

It is a further object of embodiments of the present disclosure to provide a system for wind suppression to thereby provide an audio signal with improved speech recognition and speech intelligibility.

It is a further object of embodiments of the present disclosure to provide a hearing device comprising a system for reducing a negative impact of wind on the hearing device.

It is a yet further object of embodiments of the present disclosure to provide a headset comprising a system for reducing a negative impact of wind when the headset is used for audio communication.

It is also an object of embodiments of the present disclosure to provide a simple noise suppression system with simple signal processing and therefore low power consumption.

In a first aspect, the disclosure discloses a system for wind noise suppression. The system comprises a first primary microphone configured to generate a first primary electric signal indicative of a first primary audio signal. The system also comprises a second primary microphone configured to generate a second primary electric signal indicative of a second primary audio signal. The system further comprises a secondary detector configured to generate a first secondary electric signal indicative of a secondary audio signal. The system further comprises a signal processor configured to receive the first primary electric signal, the second primary electric signal, and the first secondary electric signal from the secondary detector. The signal processor comprises a wind strength module, a wind noise module, and a noise reduction module. The wind strength module is configured to determine a wind strength, based on the first primary electric signal and the second primary electric signal. The wind noise module is configured to determine a noise estimate, based on the wind strength. The noise reduction module is configured to process the first secondary electric signal to generate a noise-suppressed secondary signal, based on the determined noise estimate.

This wind noise suppression scheme can be applied in hearing devices, such as earbuds and hearing aids, to thereby provide an improved output signal. In particular, an improved voice signal can be provided by the system when the hearing device is used for communication with a far-end recipient.

In the present context, the wind noise is to be understood as unwanted acoustic disturbances from the system environment. The wind noise may be caused by wind and/or by any air flow to which the system may be exposed. The air flow typically disturbs signals of interest picked by the system, thereby degrading operation of the system and communication intelligibility when the system is used in a communication device.

The system aims at suppressing the wind noise. In the present context, suppression can be interpreted as cancellation and/or filtering of unwanted signals from the signal of interest.

The system comprises at least two primary microphones for generating primary electric signals indicative of the primary audio signals. The at least two primary microphones are typically spatially displaced from each other to thereby be exposed to slightly different audio signals.

The primary first and second audio signals may represent any sounds that may stem from the environment in which the system is used. The first and second primary audio signals may be sounds caused by turbulence near the primary microphone. The first and second primary audio signals may comprise unwanted wind noise. The first primary audio signal may be different from the second primary audio signal. The difference may be in terms of frequency components comprised in the primary audio signals. In other words, the first primary audio signal may comprise frequencies not comprised in the second audio signal. Additionally, or alternatively, the difference between the first and second primary audio signal may be in terms of amplitude, and/or power of the audio signal. Also, some frequency components in the first primary audio signal may contain more power than the same frequency components in the second primary audio signal.

The microphones convert sounds into electrical signals. The first and second primary microphones convert sounds received thereon into the first and second primary electric signals.

The first and second primary microphones may structurally be the same, i.e., they may be of the same type. However, their placement in the system may be different such that they are exposed to different audio signals.

If the system is comprised in a hearing device, the first and second primary microphones are typically arranged on an outer side of the hearing device, to thereby be exposed to the wind noise. The first and second primary microphones may be spatially separated. In some implementations, the spatial separation may be between 10 and 50 mm, such as around 16-17 mm. In some embodiments, the first primary microphone and second primary microphone are configured as a front primary microphone and a back primary microphone, respectively, configured to detect front audio signals and rear audio signals, respectively, to which the hearing device may be exposed. If the hearing device is an earbud, the front microphone may be arranged closer to the user's face while the rear microphone may be arranged to be exposed to sounds closer to the user's back.

The system may comprise three or more primary microphones for correlating the received primary audio signals.

The secondary detector may be yet another microphone of the same type as the primary microphones. The secondary detector may be a detector particularly sensitive to human speech. The secondary detector may be exposed to and be configured to be particularly sensitive to sounds of interest. Thereby, the secondary audio signal may comprise a signal of interest representing sounds of interest. The sounds of interest may typically be a speech signal from a person talking, such as the user of the system, such as a person being close to the system. Other examples of sounds of interest may be music, audio from media content, such as video, radio, etc. which may be intended for transmission by the system. The system may use the secondary audio signal for the user of the system directly, and/or the system may use the secondary audio signal to transmit it to a far-end receiver. However, the secondary audio signal may also comprise some wind noise or other noise such as when a hearing device user taps on the hearing device, or jumps, claps, or when there is a door slamming, etc. which can all degrade the sound of interest. The system of the present disclosure therefore aims at suppressing wind noise in the secondary audio signal. The secondary audio signal may represent sound from the environment, such as speech, music, or similar audio content stemming from the environment which the user of the system is in. Alternatively, the secondary audio signal may represent speech of the user of the system. The first secondary electric signal is indicative of the secondary audio signal, and thereby representation of the sound of interest. The system may comprise two or more secondary detectors.

The signal processor may be directly interconnected with the primary microphones for receiving primary electric signals, such as the first and the second primary electric signals. The signal processor may also have a direct connection with the secondary detector for receiving the first secondary electric signal therefrom. Alternatively, the signals from the primary microphones and/or from the secondary microphones may pass other components for additional pre-processing, before arriving at the signal processor. The signal processor may be configured to modify the first secondary electric signal by suppressing wind noise primarily identified by the primary microphones. Therefore, the signal processor may cancel wind noise from the sound of interest comprised in the secondary audio signal.

The wind strength module, comprised in the signal processor, at first determines a wind strength based on the first primary electric signal and the second primary electric signal. The wind strength module may determine the wind strength by comparing the primary electric signals to thereby measure the difference between the primary electric signals. The wind strength module may compare the first and second primary electric signals as generated with the primary microphones, or it may compare the primary electric signals after these have been sampled in either time or frequency domain. The primary electric signals may be sampled with low sample rate, which may then be followed by a divisional filtration. In the present context, the wind strength may represent a measure of wind, i.e., air turbulence, in the proximity of the primary microphones. The wind strength may represent a relative wind speed and/or wind direction observed from the primary signals received at the primary microphones. The wind strength may be a scalar value. The wind strength may be a unitless scalar. The wind strength may represent the difference between the primary audio signals detected by the primary microphones. The wind strength may represent a level of correlation between the primary audio signals. The higher the correlation is, the lower the wind strength may be. The wind strength determined by the wind strength module may be translated to other values, such as to the Beaufort scale. The wind strength module may receive the primary electric signals in the time domain. The primary electric signals resulting from the primary sounds which typically dynamically change may result in the wind strength which also dynamically change over time.

The wind noise module may receive the wind strength from the wind strength module to determine the noise estimate. In other words, the wind noise module translates the wind strength into the noise estimate, e.g. a running average of correlation of the primary microphones inputs at low frequencies can be performed. When the primary signals are highly correlated the noise estimate may be low and when the primary signals are not correlated the noise estimate may be high. The determined noise estimate may represent wind noise per frequency. The determined noise estimate may represent a wind noise power spectrum, i.e., the noise estimate may represent a frequency distribution of the wind noise power. The noise estimate may be understood as a varying gain which is to be applied to the first secondary electric signal. The noise estimate is configured to suppress wind noise on the first secondary electric signal. The noise estimate may be a frequency varying gain. The noise estimate may be a frequency varying gain configured for suppressing noise in the first secondary electric signal. The noise estimate may be a frequency varying gain configured for suppressing wind noise in the first secondary electric signal.

The noise reduction module may receive the first secondary electric signal from the secondary detector. The noise reduction module may also receive the noise estimate from the wind noise module and use the noise estimate in processing of the first secondary electric signal. The noise reduction module performs suppression of wind noise which may be present in the first secondary signal. The noise reduction module may generate a frequency distribution of the first secondary electric signal and use the noise estimate to thereby generate the noise-suppressed secondary signal. The noise estimate may be applied onto the first secondary electric signal thereby suppressing the wind noise which may be present in the first secondary electric signal. In other words, the varying gain, being a representative of the noise estimate, may be applied onto the secondary signal. The noise suppression may be performed in the frequency domain. The noise-suppressed secondary signal is based on a relationship between the noise estimate and the first secondary electric signal. The noise reduction module uses the signals from the primary microphones to suppress wind noise in the secondary signal. The noise reduction module may be configured to process the first secondary electric signal to generate a noise-suppressed secondary signal by applying the noise estimate as a frequency varying gain unto the first secondary electric signal. The noise reduction module may be configured to process the first secondary electric signal to generate a noise-suppressed secondary signal by specifically removing noise or wind noise from the first secondary electric signal, e.g., by applying the noise estimate as a frequency varying gain unto the first secondary electric signal.

It is an advantage of the present disclosure that by measuring the primary signals sensitive to wind noise and by determining an estimate of the wind strength, which is then used to perform wind noise suppression on the secondary signal, it is possible to obtain the signal of interest free from wind noise, thereby reducing a negative impact of the wind noise on the signal of interest. As the wind noise continuously change, the determined wind strength, and thereby noise estimate may continuously change. By determining the continuous change of the wind noise, it is possible to reduce the negative impact of the wind noise in real time.

It is an advantage of the present disclosure that noise suppression may be performed on the secondary signal, such as a voice signal, based on a correlation between other microphones input signal, i.e. signals from the primary microphones. Hence, the primary microphones may be used as detectors for applying a correct noise suppression scheme to a secondary signal obtained via the secondary detector.

It is a further advantage of the present disclosure that mixing of the different signals from the primary microphones and/or the secondary detector may be controlled based on a correlation between the at least two primary microphones and wherein the correlation between the at least two primary microphones is further used to perform noise suppression on the secondary input signal.

In some embodiments, the signal processor further comprises a mixing module configured to control mixing of the first and/or second primary audio signals and the noise-suppressed secondary signal based on the derived wind strength. The mixing module may be configured to control mixing of a second secondary signal with the noise-suppressed secondary signal based on the derived wind strength. The second secondary signal may stem from yet another microphone and/or a detector configured to pick up both the wind noise and the sound of interest. The second secondary signal may be pre-processed before being mixed at the mixing module. The mixing module may comprise a summer for generating a mixed signal. The mixed signal may be a sum of the noise-suppressed secondary signal and the primary signals. The mixed signal may be a sum of the noise-suppressed secondary signal and the second secondary signal. The mixing module may dynamically control the contribution of the noise-suppressed secondary signal in a resulting output signal depending on the derived wind strength, i.e., the mixing module may apply the derived wind strength on the mixed signal and thereby generate the resulting output signal which dynamically and continuously change as the wind dynamically and continuously changes. By providing the mixing module it is possible to obtain the resulting signal which combines the noise-suppressed secondary signal and yet another signal comprising both the wind noise and the sounds of interest.

In some embodiments, the system further comprises a down-sampling module configured to down-sample the first and second primary electric signals before sending the first and second primary electric signals to the wind strength module. The primary microphone signals are typically resampled at a low sample rate, e.g., around 250 Hz. The down-sampling may be performed in time domain or in frequency domain. The low sampling rate is applied to the wind, which is predominantly made up of low-frequency content, between 20 Hz to 250 Hz. It is an advantage to perform down-sampling on the highly uncorrelated wind signals to thereby simplify their processing.

In some embodiments, the wind strength module is configured to correlate the first and second primary electric signals received at the first and second primary microphones to thereby derive wind strength. The correlation of the first and second primary electric signals may be understood as the convolution between the first (or second) signal with the functional inverse version of the second (or first) signal. Alternatively, other methods may be used for expressing the correlation, such as Pearson's correlation coefficient. The resultant signal being the wind strength is the cross-correlation of the two input signals. The correlation of the primary signals reflects similarity of the two signals. It is an advantage to use the correlation of the primary signals to obtain the wind strength as the correlation is a simple way of comparing two signals.

In some embodiments, the wind strength module is configured to determine a cut-off frequency, based on the first primary electric signal and the second primary electric signal. The cut-off frequency may be determined from the wind strength. The cut-off frequency may be understood as a frequency determining a region dominated by wind. The cut-off frequency may be understood as a frequency determining a region perceptually dominated by wind, and thus suitable for communication purposes. Typically, the more wind, the higher the cut-off frequency is. The cut-off frequency may take a value between 20 Hz and 250 Hz. The cut-off frequency may be a dynamic value which changes as the wind change. The cut-off frequency may be sent from the wind strength module to the noise reduction module, together with the determined wind strength, to thereby take part in wind noise suppression on the first secondary electric signal. In some embodiments, the cut-off frequency may be sent to the wind noise nodule and may be used, together with the wind strength, in determination of the wind noise estimate. The cut-off frequency may also be sent to the mixing module to control mixing of signals. By having the cut-off frequency determined from the primary signals, the region mostly dominated by wind is determined and thereby better wind noise suppression is achieved.

In some embodiments, the mixing module comprises an adaptive filter configured to filter the first and second primary electric signals and the noise-suppressed secondary signal based on the cut-off frequency. A transfer function of the adaptive filter may be controlled by the cut-off-frequency. As the cut-off-frequency may be a dynamic value, the mixing module may dynamically adjust the filters' response to obtain the desired mix of signals coming to the mixing module. The adaptive filter may be configured to filter the noise-suppressed secondary signal and a tertiary signal. The tertiary signal may be the first and second primary electric signals and the second secondary electric signal. The adaptive filter may be configured to filter the noise-suppressed secondary signal and the tertiary signal based on the wind strength. Alternatively, or additionally, the transfer function of the adaptive filter may be controlled by the wind strength. The noise suppressed-secondary signal and a low-pass output of the tertiary signal may be mixed and filtered in the mixing module. The low-pass output of the tertiary signal may be defined as a filtered tertiary signal filtered with a low-pass filter filtering only frequencies below the cut-off frequency. The adaptive filter may apply weight x, determined by the wind strength, to the noise suppressed-secondary (NSS) signal and the tertiary signal (TS) to thereby obtain its low-pass output:

$$\text{low-pass output} = NSS(f)*x + TS(f)*(1-x),$$

where 0≤f≤cut-off frequency.

The adaptive filter may apply weight x, determined by the wind strength, to the noise suppressed secondary (NSS) signal and the tertiary signal (TS) to thereby obtain its high-pass output:

$$\text{high-pass output} = TS(f),$$

where cut-off frequency≤f≤∞.

The output of the mixer module may be the sum of the high-pass output and the low-pass output.

In some embodiments, the mixing module comprises a frequency mixer that mixes the first and/or second primary audio signals and the noise-suppressed secondary signal based on the wind strength and/or based on frequencies of the first and/or second primary audio signals and the noise-suppressed secondary signal. The frequency mixer performs frequency adjustments to thereby suppress frequencies of the wind noise and thereby provide an improved resulting signal with suppressed wind noise.

In some embodiments, the secondary detector comprises a voice-pick-up (VPU) sensor configured to detect human speech. The VPU sensor may be a bone-conduction microphone, a vibrational sensor, an accelerometer, an in-the-ear microphone, or any other sensor configured to be particularly sensitive to user's voice. In general, the VPU sensor may be configured to provide a voice signal with a better signal to noise ratio (SNR) compared to the primary microphones, and especially in lower frequencies, such as frequencies below 1 kHz. By having a VPU sensor as a part of the system, the system for wind suppression can provide a resulting audio signal with improved speech recognition and speech intelligibility.

In some embodiments, the secondary signal may also be a signal obtained from a machine learning algorithm. Based on the wind strength, the machine learning algorithm may generate a secondary signal. Such input may especially be used when there is a lot of wind.

In some embodiments, the secondary detector is a bone-conduction sensor. When the system is used in a hearing device, the bone conduction sensor is typically placed in the ear canal of the hearing device user to detect vibrations generated in the user's skull while the user speaks, alternatively the bone conduction sensor is placed in or around the outer ear of the user, e.g., in or around the tragus, concha or similar. The bone conduction sensor may also be influenced by the wind noise, even though it is placed in the ear-canal. The wind noise suppression system aims at suppressing any wind noise that may be present in the signal from the bone conduction sensor.

In some embodiments, the noise reduction module comprises an analysis filter bank coupled to the secondary detector. The analysis filter bank may be obtained from lab recordings and then look-up tables may be created. Based on the output from wind strength module, a right filter can be selected. Alternatively, the wind noise module may determine a function according to which the filter bank may operate. The filter bank may comprise an array of bandpass filters that separates the secondary signal into multiple components, each one carrying a single frequency sub-band of the original secondary signal. These bands can be around 125 Hz, 250 Hz, 375 Hz, and 1 kHz. Alternatively, the noise reduction module may comprise only an adaptive filter which adaptively controls filtering of the signal from the secondary detector.

In some embodiments, the mixing module is further configured to generate a voice signal, the voice signal being configured to be transmitted. The voice signal mainly originates from the secondary detector from which wind noise is filtered out. The voice signal may then be sent to a communication unit for further processing and transmission to another system, such as a smartphone used by the far-end recipient.

In a second aspect, disclosed is method for wind noise suppression. The method comprises generating, by a first primary microphone, a first primary electric signal indicative of a first primary audio signal. The method also comprises generating, by a second primary microphone, a second primary electric signal indicative of a second primary audio signal. The method also comprises generating, at a secondary detector, a first secondary electric signal indicative of a secondary audio signal. The method then comprises receiving, at a signal processor, the first primary electric signal, the second primary electric signal, and the first secondary electric signal from the secondary detector. The signal processor comprises determining, at a wind strength module, a wind strength based on the first primary electric signal and the second primary electric signal, determining, at a wind noise module, a noise estimate based on the wind strength, and processing, at a noise reduction module, the first secondary electric signal to thereby generate a noise-suppressed secondary signal based on the determined noise estimate. It should be understood that all the embodiments, benefits and advantages described in connection with the first aspect are equally relevant for this second aspect.

In a preferred embodiment, the method may comprise detecting the primary sounds at the primary microphones and at the same time detecting the secondary sound at the secondary detector comprising a voice-pick-up sensor configured to detect human speech. The method further comprises correlating the primary signals by the wind strength module to thereby derive the wind strength, then further receiving the wind strength at the wind noise module, and deriving the noise estimate in the form of a noise power spectrum. The secondary signal and the noise power spectrum are then received at the noise reduction module which applies the noise power spectrum to the secondary signal to thereby generate a noise-suppressed human speech. Finally, the method comprises a controlled mixing of the primary signals and the noise-suppressed human speech at the mixing module based on the derived wind strength.

In a third aspect, disclosed is a hearing device comprising a system for wind noise suppression according to the first aspect. It should be understood that all the embodiments, benefits and advantages described in connection with the first aspect are equally relevant for this third aspect. By providing the hearing device with the wind noise suppression system it is possible to reduce a negative impact of wind on the hearing device.

The hearing device may be configured to be worn by a user. The hearing device may be arranged at the user's ear, on the user's ear, over the user's ear, in the user's ear, in the user's ear canal, behind the user's ear, and/or in the user's concha.

The hearing device may be configured to be worn by a user at each ear, e.g., a pair of ear buds or a head set with two earcups. In the embodiment where the hearing device is to be worn at both ears, the components meant to be worn at each ear may be connected, such as wirelessly connected and/or connected by wires, and/or by a strap. The components meant to be worn at each ear may be substantially identical or differ from each other.

The hearing device may be a hearable such as a headset, headphones, earphones, ear bud, hearing aids, an over the counter (OTC) hearing device, a hearing protection device, a one-size-fits-all hearing device, a custom hearing device or another head-wearable hearing device.

The hearing device may be embodied in various housing styles or form factors. Some of these form factors are earbuds, on the ear headphones, or over the ear headphones. The person skilled in the art is aware of various kinds of hearing devices and of different options for arranging the hearing device in and/or at the ear of the hearing device wearer.

The hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into an electric input signal. The electric input signal may be an analogue signal. The electric input signal may be a digital signal. The one or more input transducer(s) may be coupled to one or more analogue-to-digital converter(s) configured for converting the analogue input signal into a digital input signal.

The hearing device may comprise one or more antenna(s) configured for wireless communication. The one or more antenna(s) may comprise an electric antenna. The electric antenna is configured for wireless communication at a first frequency. The first frequency may be above 800 MHZ, preferably a wavelength between 900 MHz and 6 GHz. The first frequency may be 902 MHz to 928 MHz. The first frequency may be 2.4 to 2.5 GHZ. The first frequency may be 5.725 GHz to 5.875 GHz. The one or more antenna(s) may comprise a magnetic antenna. The magnetic antenna may comprise a magnetic core. The magnetic antenna comprises a coil. The coil may be coiled around the magnetic core. The magnetic antenna is configured for wireless communication at a second frequency. The second frequency may be below 100 MHZ. The second frequency may be between 9 MHZ and 15 MHZ.

The hearing device may comprise one or more wireless communication unit(s). The one or more wireless communication unit(s) may comprise one or more wireless receiver (s), one or more wireless transmitter(s), one or more transmitter-receiver pair(s), and/or one or more transceiver(s). At least one of the one or more wireless communication unit(s) may be coupled to the one or more antenna(s). The wireless communication unit may be configured for converting a wireless signal received by at least one of the one or more antenna(s) into an electric input signal. The hearing device may be configured for wired/wireless audio communication, e.g., enabling the user to listen to media, such as music or radio, and/or enabling the user to perform phone calls.

A wireless signal may originate from external source(s), such as spouse microphone device(s), wireless audio transmitter, a smart computer, and/or a distributed microphone array associated with a wireless transmitter.

The hearing device may be configured for wireless communication with one or more external devices, such as one or more accessory devices, such as a smartphone and/or a smart watch.

The hearing device includes a signal processor. The signal processor may be configured for processing one or more input signals. The processing may comprise compensating for a hearing loss of the user, i.e., apply frequency dependent gain to input signals in accordance with the user's frequency dependent hearing impairment. The processing may comprise performing feedback cancellation, beamforming, tinnitus reduction/masking, noise reduction, noise cancellation, speech recognition, bass adjustment, treble adjustment, face balancing and/or processing of user input. The signal processor may be a processor, an integrated circuit, an application, functional module, etc. The signal processor may be implemented in a signal-processing chip or a printed circuit board (PCB). The signal processor is configured to provide an electric output signal based on the processing of one or more input signals. The signal processor may be configured to provide one or more further electric output signals. The one or more further electric output signals may be based on the processing of one or more input signals. The signal processor may comprise a receiver, a transmitter and/or a transceiver for receiving and transmitting wireless signals. The signal processor may control one or more playback features of the hearing device.

The hearing device may comprise an output transducer. The output transducer may be coupled to the signal processor. The output transducer may be a loudspeaker, or any other device configured for converting an electrical signal into an acoustical signal. The receiver may be configured for converting an electric output signal into an acoustic output signal.

The wireless communication unit may be configured for converting an electric output signal into a wireless output signal. The wireless output signal may comprise synchronization data. The wireless communication unit may be configured for transmitting the wireless output signal via at least one of the one or more antennas.

The hearing device may comprise a digital-to-analogue converter configured to convert an electric output signal or a wireless output signal into an analogue signal.

The hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The hearing device may comprise a memory, including volatile and non-volatile forms of memory.

In some embodiments, the hearing device may be a headset or one or more earbuds, such as a hearing protector including earmuffs, ear plugs, etc. It is advantageous to provide a headset or another device for audio communication with the wind noise suppression system to thereby reduce any negative impact of wind when the headset or another audio device is used for audio communication with a far-end recipient.

The present disclosure relates to different aspects including the noise suppression system described above and, in the following, the noise suppression method, and a hearing device, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
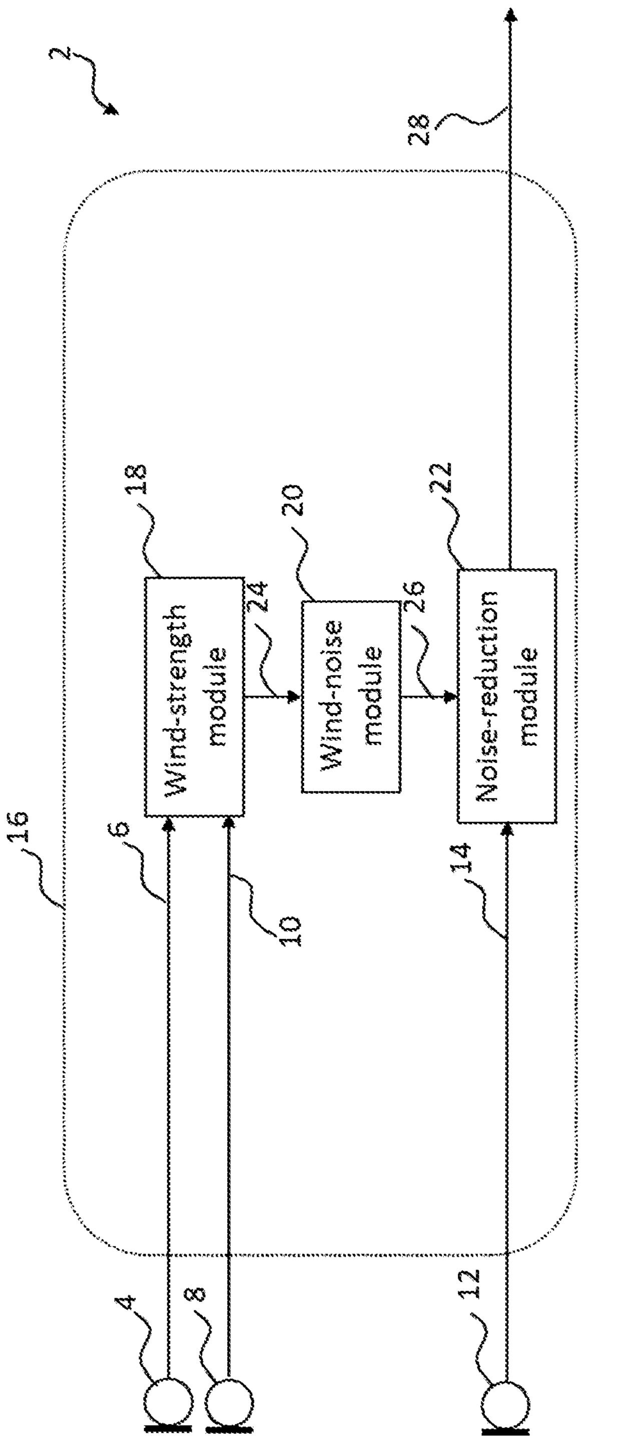
FIG. 1 schematically illustrates an exemplary embodiment of a system for wind noise suppression according to the present disclosure, FIG. 2 schematically illustrates another exemplary embodiment of a system for wind noise suppression according to the present disclosure, FIG. 3 schematically illustrates yet another exemplary embodiment of a system for wind noise suppression according to the present disclosure, FIG. 4 schematically illustrates yet another exemplary embodiment of a system for wind noise suppression according to the present disclosure, FIG. 5 schematically illustrates yet another exemplary embodiment of a system for wind noise suppression according to the present disclosure, and FIG. 6 schematically illustrates an exemplary embodiment of a hearing device comprising a system for wind noise suppression according to the present disclosure.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed disclosure or as a limitation on the scope of the claimed disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an exemplary embodiment of a system 2 for wind noise suppression according to the present disclosure. The system 2 for wind noise suppression comprises a first primary microphone 4 configured to generate a first primary electric signal 6 indicative of a first primary audio signal. The system 2 comprises a second primary microphone 8 configured to generate a second primary electric signal 10 indicative of a second primary audio signal. The system 2 comprises a secondary detector 12 configured to generate a first secondary electric signal 14 indicative of a secondary audio signal. The system 2 further comprises a signal processor 16 configured to receive the first primary electric signal 6, the second primary electric signal 10, and the first secondary electric signal 14 from the secondary detector 12. The signal processor 16 comprises a wind strength module 18, a wind noise module 20, and a noise reduction module 22. The wind strength module 18 is configured to determine a wind strength 24, based on the first primary electric signal 6 and the second primary electric signal 10. The wind noise module 20 is configured to determine a noise estimate 26, based on the wind strength 24. The noise reduction module 22 is configured to process the first secondary electric signal 14 to generate a noise-suppressed secondary signal 28, based on the determined noise estimate 26.

Figure 2:
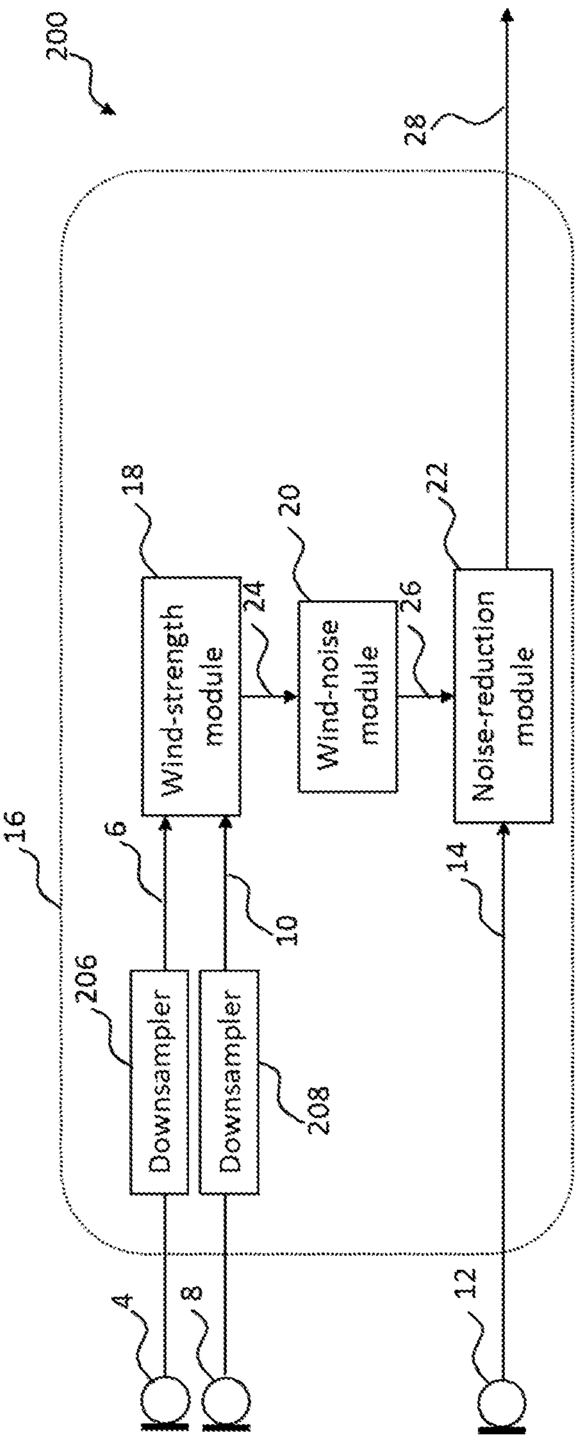

FIG. 2 schematically illustrates another exemplary embodiment of a system 200 for wind noise suppression according to the present disclosure. The system 200 in addition to the components of the system 2, further comprises down-sampling modules 204 and 208 configured to down-sample the first primary electric signal 6 and the second primary electric signal 10.

Figure 3:
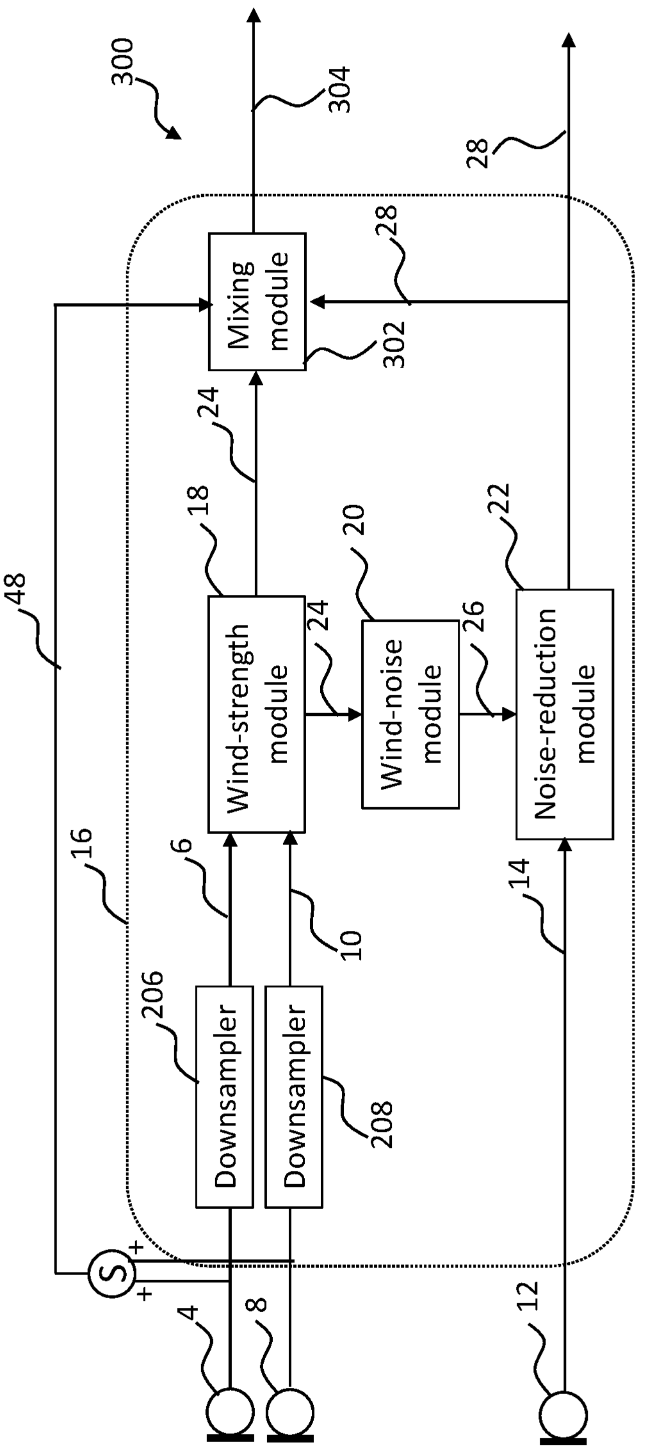

FIG. 3 schematically illustrates yet another exemplary embodiment of a system 300 for wind noise suppression according to the present disclosure. The system 300 in addition to the components of the system 200, further comprises a mixing module 302 configured to control mixing of a primary signal sum 48 (a sum of the first 4 and/or second 8 primary audio signals) and the noise-suppressed secondary signal 28 based on the derived wind strength 24. The mixing module 302 may dynamically control the contribution of the noise-suppressed secondary signal 28 in a resulting output signal 304 depending on the derived wind strength 24, i.e., the mixing module 302 may apply the derived wind strength 24 on a mixed signal and thereby generate the resulting output signal 304 which dynamically and continuously change as the wind dynamically and continuously changes. By providing the mixing module 302 it is possible to obtain the resulting signal 304 which combines the noise-suppressed secondary signal 28 and yet another signal, 48, possibly comprising both the wind noise and the sounds of interest.

Figure 4:
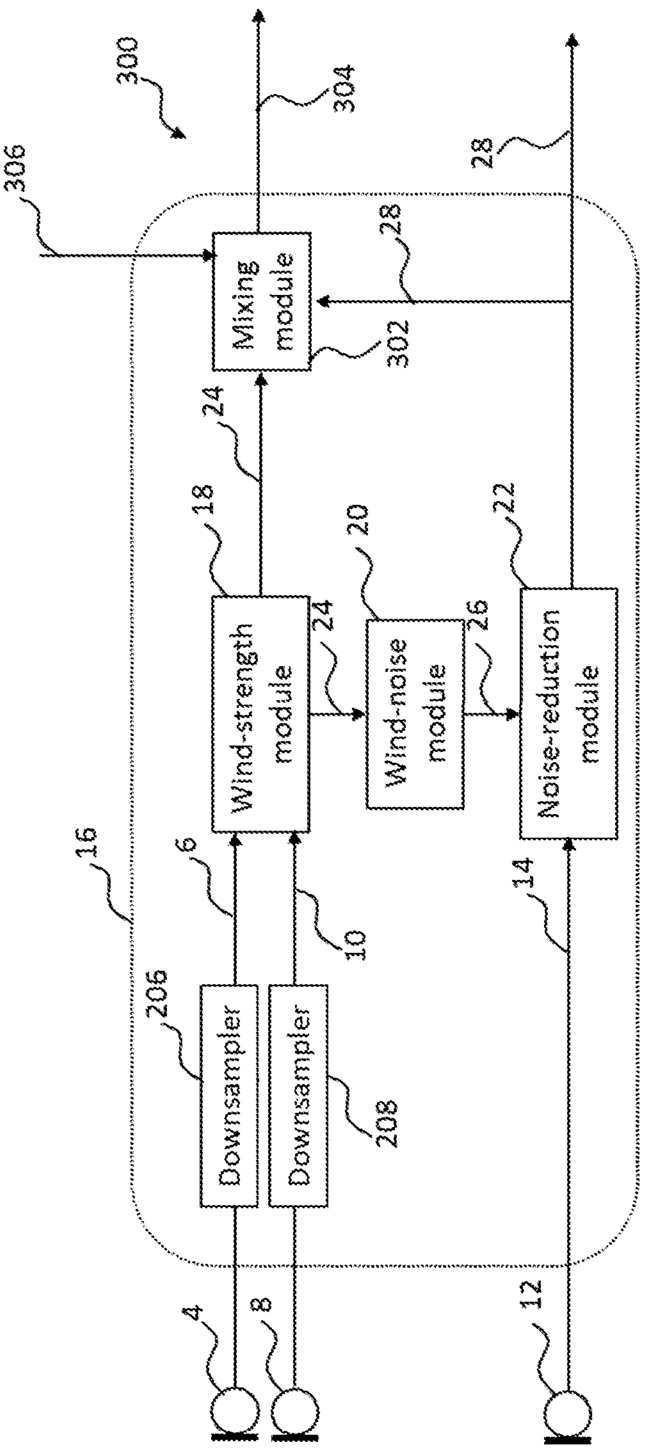

FIG. 4 schematically illustrates yet another exemplary embodiment of a system 300 for wind noise suppression according to the present disclosure In comparison to the system shown in FIG. 3, the system 300 shown in FIG. 4 may further comprise a component generating a second secondary signal 306. The mixing module 302 may be configured to control mixing of the second secondary signal 306 with the noise-suppressed secondary signal 28 based on the derived wind strength 24, instead of mixing the primary signal sum 48 and the noise-suppressed secondary signal 28, shown in FIG. 3. The second secondary signal 306 may stem from yet another microphone and/or a detector configured to pick up both the wind noise and the sound of interest. The second secondary signal 306 may be pre-processed before being mixed at the mixing module 302. The mixing module 302 may dynamically control the contribution of the noise-suppressed secondary signal 28 in a resulting output signal 304 depending on the derived wind strength 24, i.e., the mixing module 302 may apply the derived wind strength 24 on a mixed signal and thereby generate the resulting output signal 304 which dynamically and continuously change as the wind dynamically and continuously changes. By providing the mixing module 302 it is possible to obtain the resulting signal 304 which combines the noise-suppressed secondary signal 28 and the second secondary signal 306, possibly comprising both the wind noise and the sounds of interest.

Figure 5:
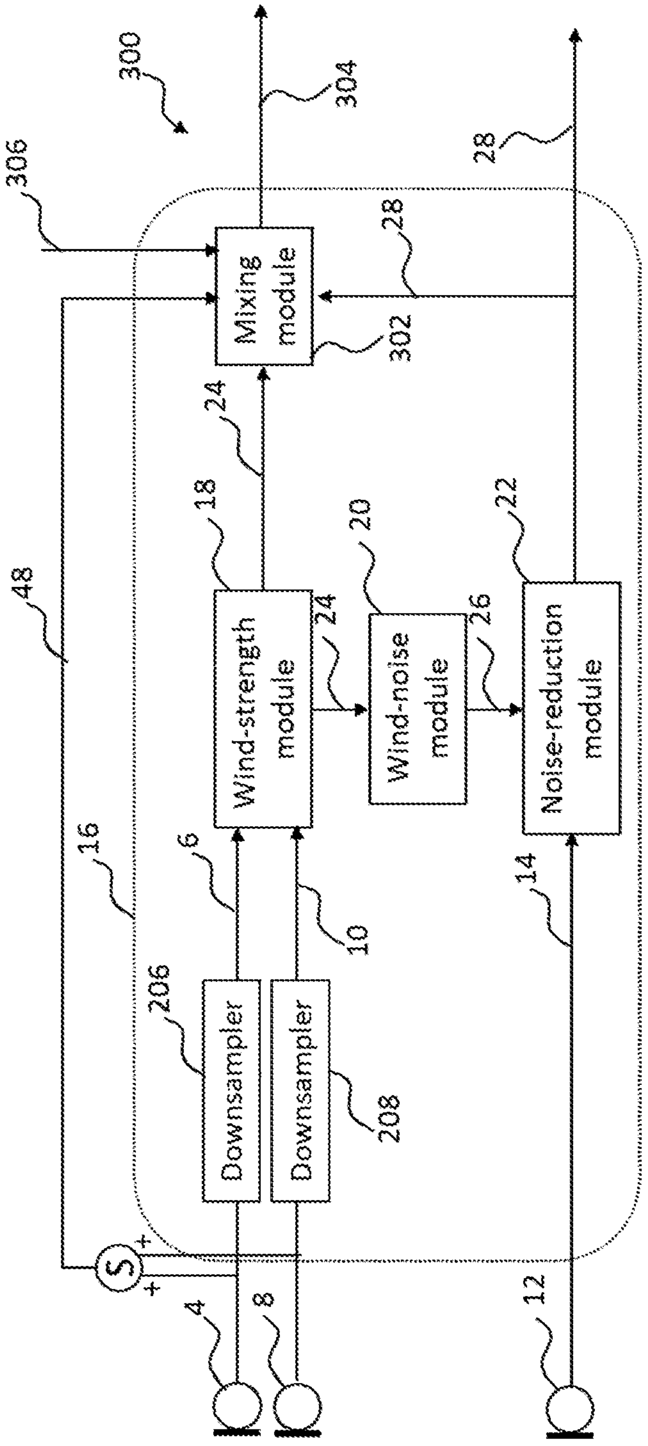

FIG. 5 schematically illustrates yet another exemplary embodiment of a system 300 for wind noise suppression according to the present disclosure. The system 300 shown in FIG. 5 combines the mixing of the second secondary signal 306, the primary signal sum 48 and the noise-suppressed secondary signal 28 in the mixing module 302 based on the derived wind strength 24.

Figure 6:
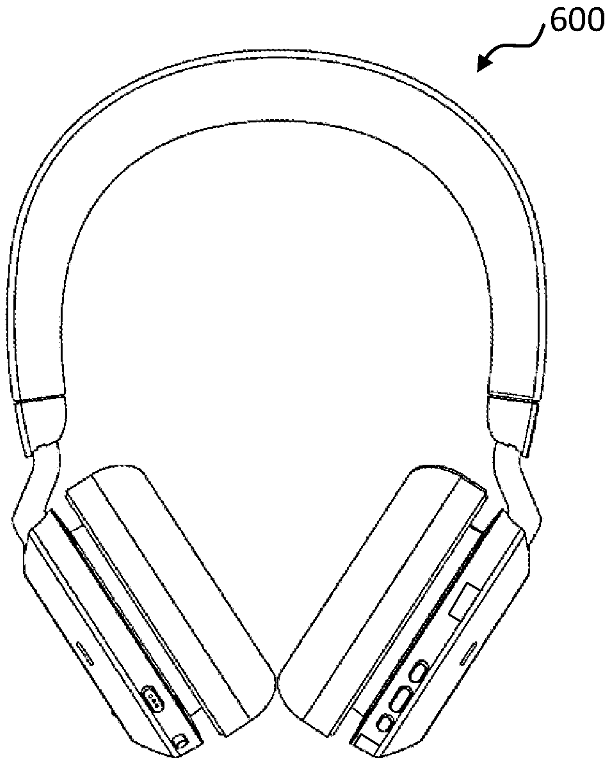

FIG. 6 schematically illustrates an exemplary embodiment of a hearing device 600 comprising the system for wind noise suppression according to the present disclosure and which can be in accordance with any of the systems shown in FIGS. 1-5.

Although particular features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

LIST OF REFERENCES

2 system for wind noise suppression
4 first primary microphone
6 first primary electric signal
8 second primary microphone
10 second primary electric signal
12 secondary detector
14 first secondary electric signal
16 signal processor
18 wind strength module
20 wind noise module
22 noise reduction module
24 wind strength
26 noise estimate
28 noise-suppressed secondary signal
48 primary signal sum
200 system for wind noise suppression
204 down-sampling module
208 down-sampling module
300 system for wind noise suppression
302 mixing module
304 resulting output signal
306 second secondary signal
600 hearing device

The invention claimed is:

1. A system for wind noise suppression comprising:

a first primary microphone configured to generate a first primary electric signal indicative of a first primary audio signal, a second primary microphone configured to generate a second primary electric signal indicative of a second primary audio signal, a secondary detector configured to generate a first secondary electric signal indicative of a secondary audio signal;

a signal processor configured to receive the first primary electric signal, the second primary electric signal, and the first secondary electric signal from the secondary detector, wherein the signal processor comprises:

a wind strength module configured to:

determine a wind strength by correlating the first primary electric signal and the second primary electric signal, and determine a cut-off frequency based on the determined wind strength;

a wind noise module configured to determine a noise estimate, based on the determined cut-off frequency and the determined wind strength; and a noise reduction module configured to:

receive the first secondary electric signal from the secondary detector, receive the noise estimate from the wind noise module, apply the noise estimate as a frequency varying gain onto the first secondary electric signal to generate a noise-suppressed secondary signal; and a mixing module configured to control mixing and generate a dynamic output signal by:

adding at least one of the first primary audio signal or the second primary audio signal to the noise-suppressed secondary signal, and applying the cut-off frequency and the determined wind strength to a sum of the noise-suppressed secondary signal and at least one of the first or the second primary audio signals.

2. The system according to claim 1, wherein the system further comprises a down-sampling module configured to down-sample the first and second primary electric signals before sending the first and second primary electric signals to the wind strength module.

3. The system according to claim 1, wherein the mixing module comprises an adaptive filter configured to filter the first and second primary electric signals and the noise-suppressed secondary signal based on the cut-off frequency.

4. The system according to claim 1, wherein the mixing module comprises a frequency mixer that mixes at least one of the first or second primary audio signals and the noise-suppressed secondary signal based on at least one of the determined wind strength or based on frequencies of the at least one of the first or second primary audio signals and the noise-suppressed secondary signal.

5. The system according to claim 1, wherein the secondary detector comprises a voice-pick-up sensor configured to detect human speech.

6. The system according to claim 1, wherein the secondary detector is a bone-conduction sensor.

7. The system according to claim 1, wherein the noise reduction module comprises an analysis filter bank coupled to the secondary detector.

8. The system according to claim 1, wherein the mixing module is further configured to generate a voice signal to be transmitted.

9. A hearing device comprising the system according to claim 1.

10. The hearing device according to claim 9, wherein the hearing device is a headset or one or more earbuds.

11. A method for wind noise suppression comprising:

generating, by a first primary microphone, a first primary electric signal indicative of a first primary audio signal, generating, by a second primary microphone, a second primary electric signal indicative of a second primary audio signal, generating, at a secondary detector, a first secondary electric signal indicative of a secondary audio signal;

receiving, at a signal processor, the first primary electric signal, the second primary electric signal, and the first secondary electric signal from the secondary detector, wherein the signal processor performs processing comprising:

determining, at a wind strength module, a wind strength correlating the first primary electric signal and the second primary electric signal;

determining a cut-off frequency based on the determined wind strength;

determining, at a wind noise module, a noise estimate based on the determined cut-off frequency and the determined wind strength;

at a noise reduction module:

receiving the first secondary electric signal from the secondary detector, receiving the noise estimate from the wind noise module, and generating a noise-suppressed secondary signal by applying the determined noise estimate as a frequency varying gain onto the first secondary electric signal; and at a mixing module, mixing at least one of the first or second primary audio signals and the noise-suppressed secondary signal by applying the cut-off frequency and the determined wind strength to a sum of the noise-suppressed secondary signal and at least one of the first or the second primary audio signals to control mixing and generate a dynamic output signal.

* * * * *